March 27, 1962          H. PETZHOLD          3,026,736
BALL TRANSMISSION UNIT
Filed Dec. 6, 1960                    2 Sheets-Sheet 1

United States Patent Office 3,026,736
Patented Mar. 27, 1962

3,026,736
BALL TRANSMISSION UNIT
Hellmuth Petzhold, Berlin, Germany, assignor to Friedrich Cavallo, Getriebe- und Zahnraderfabrik G.m.b.H., a firm
Filed Dec. 6, 1960, Ser. No. 74,151
7 Claims. (Cl. 74—193)

The invention relates to the control of infinitely variable speed ball transmission units wherein the power transmission between the driving shaft and the driven shaft is effected by a ball adapted to be shifted between two funnel-shaped bearings provided at the ends of said shafts and simultaneously clamped by a controlable compression force.

In a known embodiment of this ball transmission unit the shifting of the ball and consequently the change in the transmission ratio is effected by a control plate arranged between two funnel-shaped bearings and engaging said ball along a diameter thereof. By shifting said plate vertically with respect to the axis of said shafts the position of the ball between the funnel-shaped bearings is changed which varies the transmission ratio.

Though this known unit functions without fault it nevertheless exhibits several disadvantages.

The novel ball transmission unit according to the invention eliminates such disadvantages. For this purpose a control pin is centrally arranged within the hollow driving shaft or within the hollow driven shaft or in each one of both shafts contacting said ball and is adapted to be axially shifted for changing the points of contact of said ball and said funnel-shaped bearings.

Other features and advantages of the invention will appear from the following description taken in connection with the drawing, wherein.

Figure 1:
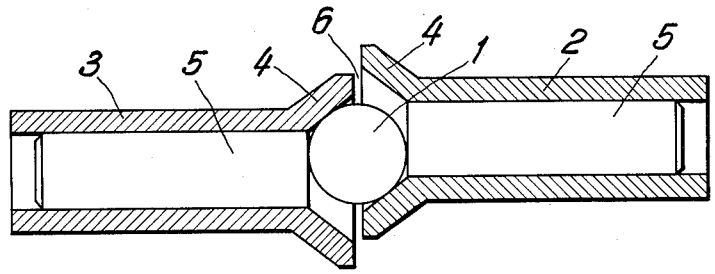
FIGURE 1 is a section showing the basic parts of a typical embodiment of the invention, illustrating the driving and driven shafts, the transmission ball and control pins in each shaft.

In a ball transmission unit provided with a freely rotatable ball the axis of rotation of the ball is parallel to the shafts of the funnel-shaped bearings.

In the known embodiment wherein the ball shift is effected by a control plate arranged between the funnel-shaped bearings the ball has its highest circumferential speed at the point of contact with the control plate. Because of the pressure at the contact area between the ball and the control plate the use of an ordinary friction bearing would exhibit excessively large forces on the ball resulting in a low efficiency of the transmission unit. Therefore, it is desirable to arrange between the control plate and the transmission ball a ball bearing mounted with its outer race within the control plate and embracing the transmission ball by its inner race.

However, the use of a ball bearing causes certain constructional difficulties. The radial shift of the ball is accompanied by an axial shift thereof. Therefore the ball is held within the inner race of the ball bearing with a correspondingly loose tolerance so that the usual tight mounting of the inner race of the ball bearing cannot be used.

This causes the disadvantage that the inner race of the ball bearing is not driven by the ball by tight fit connection but only by a pointwise acting frictional force dependent upon the control pressure for shifting the ball.

When the control pressure is low and no change in rotational speed is effected the frictional force between the transmission ball and the inner race of the ball bearing is very small so that the two parts rub together causing very rapid and disadvantageous abrasion wear. Even by using a laterally shiftable roller bearing it is not possible to embrace the transmission ball by the inner race of the bearing with a tight fit because the ball would no longer have universal rotational freedom causing the power transfer to be effected always on the same running circles of the ball and thus leading to a rapid wear. Furthermore, the axis of rotation of the ball oscillates somewhat during the ball shifting. If this oscillation is prevented, the wear between the ball and the funnel-shaped bearings is increased.

In a ball transmission unit of the type in question there are fixed mathematical relations between the range of control, the angle of the bearing funnel, the ball diameter, and the width of the gap between the funnel-shaped bearings.

The narrower the gap the more acute-angled the bearing funnel can be for a given constant range of control. The axial pressure is reduced in proportion to the inclination of the bearing funnels so that at a given constant rotational transmission the greater the inclination of the funnels the smaller is the over-all size of the transmission unit and the higher is its efficiency.

When using a control plate inserted between the bearing funnels the width of the funnel gap is automatically fixed by the necessary axial shift of the ball. Therefore, the theoretically possible improvement of the total unit by reduction of the width of the funnel gap is not practically feasible.

Contrarily thereto according to the invention the shifting of the ball 1 embraced by the bearing funnels 4 is effected by control pins 5 rotating in axial bores of the shafts 2 and 3 and adapted to engage the ball 1. Axial displacement of the pins shifts the ball along the sides of the bearing funnels thus changing the transmission ratio of the transmission unit.

Because of this new control arrangement according to the invention the contact between the control member and the ball always occurs exactly on the axis of rotation of the ball where the rotational speed is substantially zero. Even if the control pins do not rotate within the hollow shafts, the slip motion between the ball and the control pins is dependent only upon the respective position of the ball between the bearing funnels, which is of an unimportant order because the relative motion between the ball and the control pins is much smaller than in the case of the known embodiment wherein the ball is circumferentially embraced by the shiftable control plate. According to the invention however, since the controlling contact is at the axis of rotation of the transmission ball, the rotation of the ball is not affected by the control force so that the efficiency of the transmission unit is not impaired.

Since the transmission unit according to the invention does not utilize a control plate between the bearing funnels, the gap 6 between these bearing funnels 4 can be reduced to a minimum. Furthermore, the transmission unit according to the invention provides for a considerably larger control range than the known embodiment because the bearing funnels can be axially extended to compensate for the reduction in gap width.

If each side of the transmission unit is provided with a control pin in the manner shown by FIG. 1 the movements of the two pins must be uniformly coupled. This is easily accomplished.

During operation of the unit the ball automatically assumes a position wherein the rotational speed of the driven side is a minimum. Thus, by utilizing this tendency of self-adjustment of the ball a control pin on the driving side of the transmission unit is sufficient for the change in rotational speed. However, with but one control pin the speed of control in one of the two directions cannot be influenced because the speed of the return movement of the ball along the generating lines of the bearing funnels considerably depends on the respective load of the transmission unit.

Figure 2:
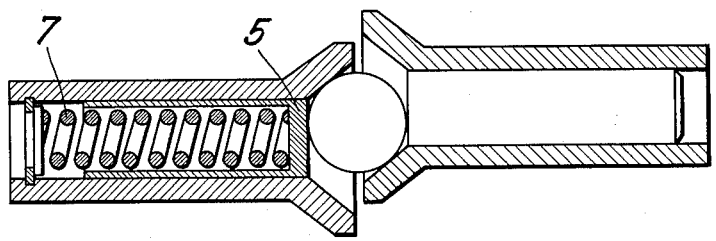
FIGURE 2 is a similar section showing one control pin biased by a resilient member.

Accordingly it is preferred to use two control pins and to couple their axial movements together. An alternating arrangement according to a preferred embodiment of the invention is shown in FIG. 2 in which one of the two control pins is pressed against the transmission ball 1 by spring 7. Thus, the ball is positively controlled in both directions even if the controlling force is only applied to the control pin not biased by a spring.

Figure 3:
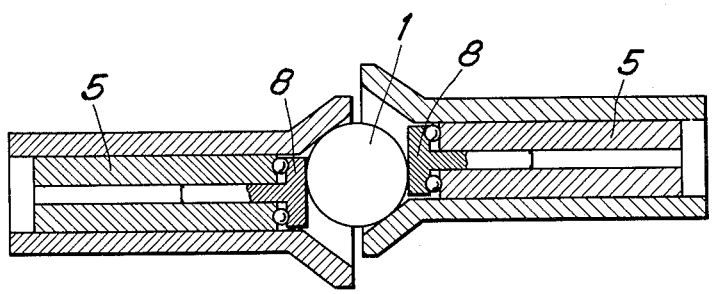
FIGURE 3 is a further similar section showing the control pins provided with rotatable head members.

In a still further embodiment of the invention shown in FIG. 3 a rotational body 8 journalled within a corresponding control pin is arranged between the ball and the control pin or control pins. In this manner there is avoided any wearing slip between the ball and the control pin if the control pin is unable to rotate in the hollow shaft. Contrarily to that the relative movement is a rolling one simultaneously improving the efficiency of the transmission unit.

In comparison with the known ball transmission unit the invention provides an improvement of the efficiency of this type of transmission by the replacement of the known radial ball control by an axial control thereof superior because of the reduced friction at the points of contact as well as by the reduction of the width of the gap between the bearing funnels.

Figure 4:
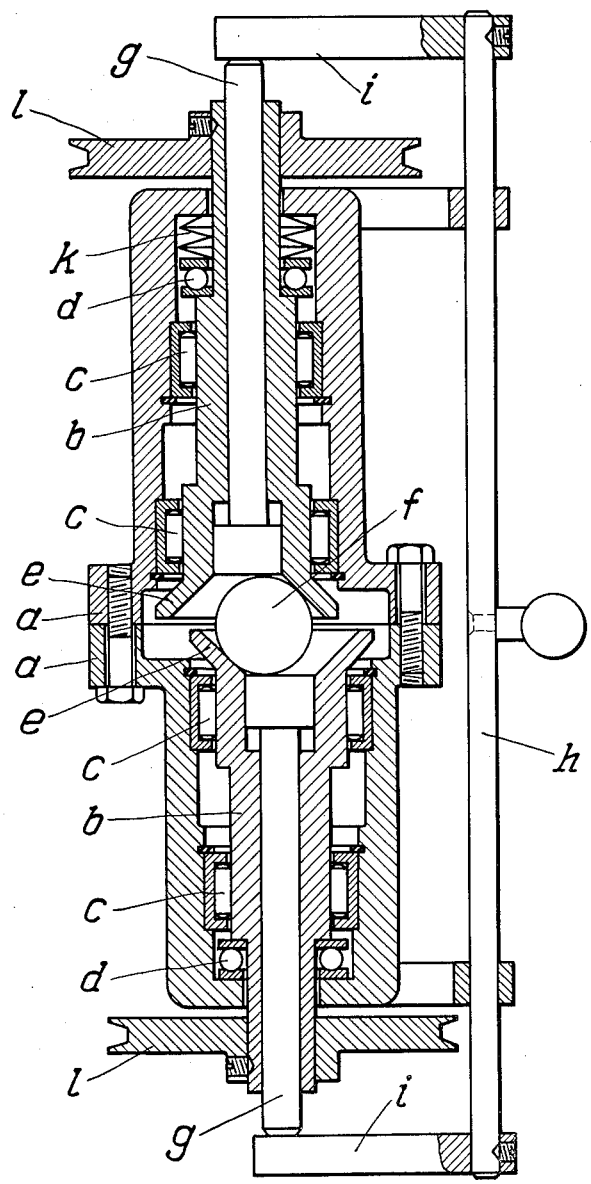
FIGURE 4 is a section of a complete transmission unit showing the means for operating the control pins.

A complete operable ball transmission unit designed according to the invention is illustrated in FIGURE 4. In this embodiment the transmission ball is axially shifted by the coupled movement of both control pins g.

The unit is substantially symmetrical with respect to the transmission ball f and therefore corresponding parts of the two halves are identified by the same reference letters.

Each half of the unit comprises a casing a of cylindrical cross-section having an outer end with a bore for shaft b and a flanged inner end. The flange serves as a means for uniting the two halves such as by screw bolts. Within the casing is mounted the driving and driven shafts b, each being in pin bearings c and in a thrust bearing d. The outer end of the shaft b projects through a bore in the outer end of the casing a and carries a V-belt pulley l fixed thereon by a setscrew. The enlarged inner head e of the shaft b is bored out to form a funnel-like cavity serving as a bearing seat for the transmission ball f.

Each shaft b is provided with a continuous bore forming the bearing for the control pin g which engages at its enlarged inner end the transmission ball f and at its outer end the fork-shaped arm i of a shiftable linkage including the connecting rod h connected between arms i and which is adapted with a central hand knob. The length of the stroke of the linkage corresponds to the control stroke of the control pins g and thereby controls the variation in the transmission ratio of the transmission unit as has been explained above.

The contact pressure between the transmission ball f and the inner walls of the funnel-shaped inner heads e of the shafts b necessary for the power transmission is provided by a resilient member, such as plate springs k attached to one of the shafts.

The transmission unit according to the invention can be designed for various transmission ranges and ratios.

Thus, the illustrated embodiment will provide for a transmission range of 1:1 up to about 1:3 and correspondingly a regulating range of 1:9.

Since certain changes may be made in carrying out the above-described mechanism without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A ball transmission unit comprising first and second shaft members, said shaft members being in parallel displaced relation, a funnel shaped portion on each of the shaft members, the funnel shaped portions being adjacent one another and cooperatively defining an enclosure, a ball member in said enclosure and engaging each of the funnel shaped portions, the ball member being displaceable in said enclosure along said funnel shaped portions, at least one of said shaft members being provided with a bore extending to said funnel shaped portion, and a control member in said bore and engaging said ball member, the control member being slidable in said bore for displacing the ball member in the enclosure.

2. A unit as claimed in claim 1 wherein the ball member defines a point of contact with each of the funnel portions, the points of contact being displaced along the funnel portions during sliding of the control member.

3. A unit as claimed in claim 1 wherein both said shaft members are provided with a bore extending to their respective funnel portions, comprising a control member in each of the bores, means coupled to the control members for simultaneously displacing the same in their respective bores.

4. A unit as claimed in claim 1 wherein one of said shaft members is a driving shaft, the other of the shaft members being driven by said driving shaft, the control member being in the bore of said driving shaft, the other shaft member being provided with a bore, the unit further comprising a pin slidably supported in the bore of the other shaft member and in engagement with the ball member, means coupled to the control member for sliding the same for displacing the ball member in the enclosure and resilient means in the bore of the other shaft engaging the pin and urging the same against the ball member.

5. A unit as claimed in claim 4 wherein the pin and control member contact the ball member at determinable points, said points defining a line which is parallel to said shaft members and passes substantially through the center of said ball member.

6. In a transmission unit as claimed in claim 1 a rotatable member inserted between said ball member and said control pin.

7. In a transmission unit as claimed in claim 2 a first rotatable member inserted between said ball member and said control member and a second rotatable member inserted between said ball member and said pin.

References Cited in the file of this patent

UNITED STATES PATENTS

| 1,489,521 | Conrad | Apr. 8, 1924 |
| 2,272,509 | Cavallo | Feb. 10, 1942 |

FOREIGN PATENTS

| 721,825 | Germany | Feb. 2, 1953 |